Figure 1:
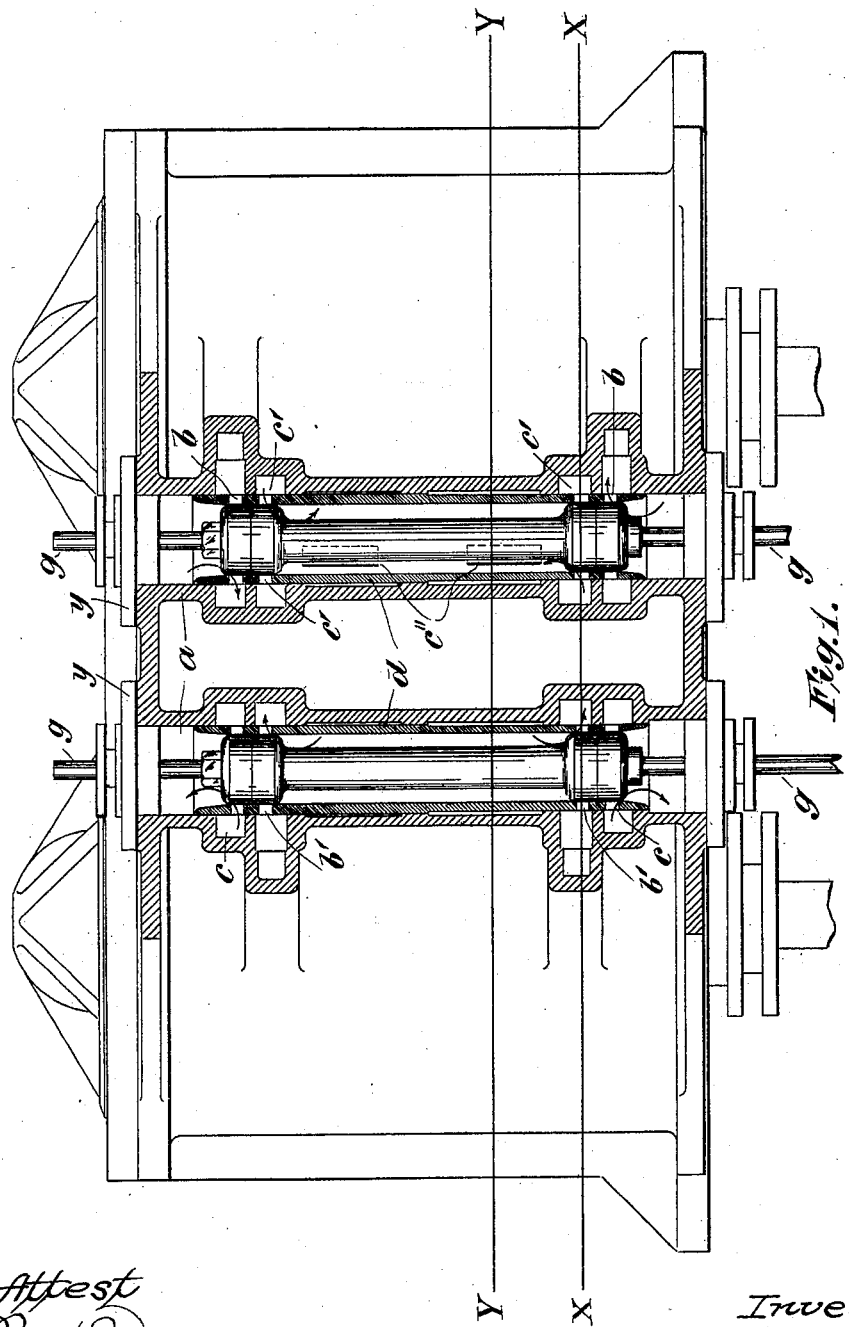

No. 682,808. Patented Sept. 17, 1901.
W. J. P. MOORE.
STEAM VALVE FOR DUPLEX PUMPS.
(Application filed Sept. 29, 1900.)
(No Model.) 8 Sheets—Sheet 1.

Attest
Walter Donaldson
Edw. L. Reed

Inventor
William James Perry Moore
By Ellis Spear
Atty

No. 682,808. Patented Sept. 17, 1901.
W. J. P. MOORE.
STEAM VALVE FOR DUPLEX PUMPS.
(Application filed Sept. 29, 1900.)

(No Model.) 8 Sheets—Sheet 2.

Attest
Walter Donaldson
Edw. L. Reed.

Inventor
William James Perry Moore
by Ellis Spear
Atty

No. 682,808. Patented Sept. 17, 1901.
W. J. P. MOORE.
STEAM VALVE FOR DUPLEX PUMPS.
(Application filed Sept. 29, 1900.)
(No Model.) 8 Sheets—Sheet 3.

Attest
Mellen Donaldson
A. J. Middleton

Inventor
William J. P. Moore
by Ellis Spear
Atty.

THE NORRIS PETERS CO., PHOTO-LITHO., WASHINGTON, D. C.

No. 682,808. Patented Sept. 17, 1901.
W. J. P. MOORE.
STEAM VALVE FOR DUPLEX PUMPS.
(Application filed Sept. 29, 1900.)
(No Model.) 8 Sheets—Sheet 4.

No. 682,808. Patented Sept. 17, 1901.
W. J. P. MOORE.
STEAM VALVE FOR DUPLEX PUMPS.
(Application filed Sept. 29, 1900.)
(No Model.) 8 Sheets—Sheet 5.
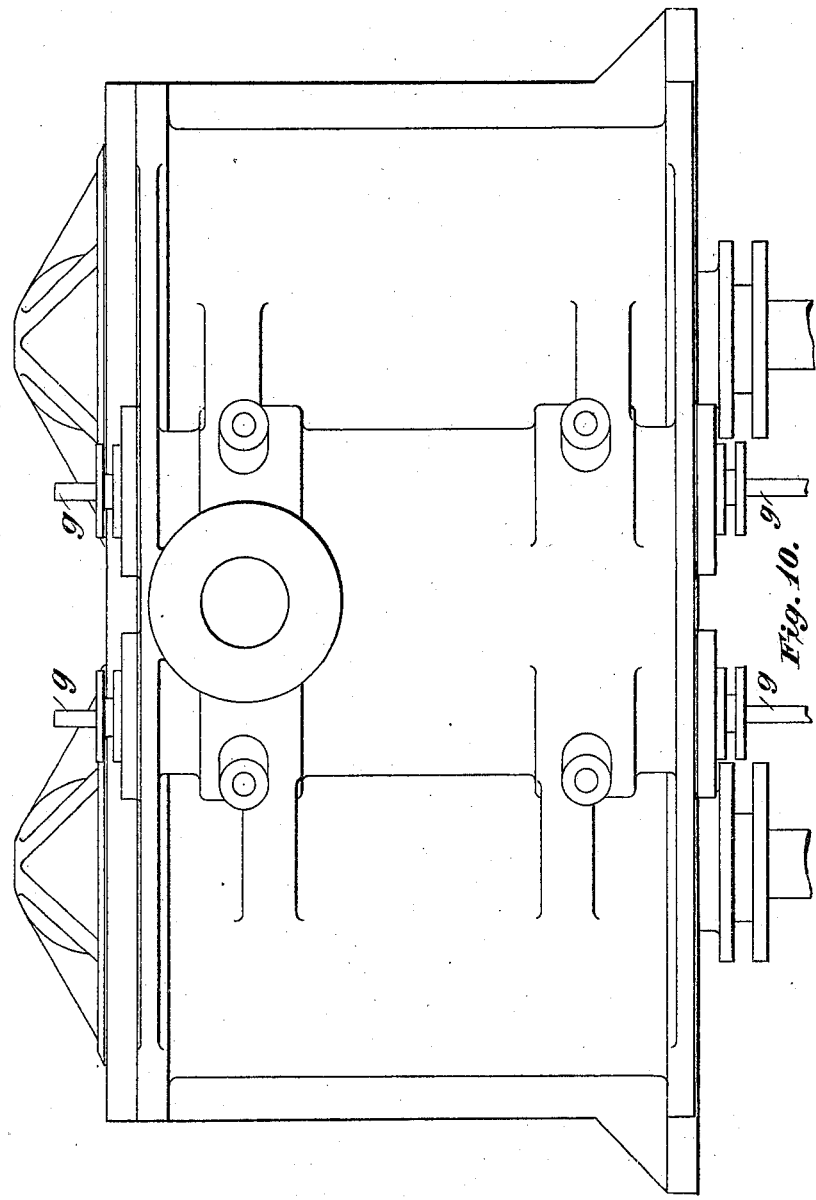
Inventor
William James Perry Moore No. 682,808. Patented Sept. 17, 1901.
W. J. P. MOORE.
STEAM VALVE FOR DUPLEX PUMPS.
(Application filed Sept. 29, 1900.)
(No Model.) 8 Sheets—Sheet 6.

No. 682,808. Patented Sept. 17, 1901.
W. J. P. MOORE.
STEAM VALVE FOR DUPLEX PUMPS.
(Application filed Sept. 29, 1900.)

(No Model.) 8 Sheets—Sheet 7.

Attest
Edw. L. Reed.
R. E. Durand.

Inventor
William James Perry Moore
by Ellis Spear
Atty.

No. 682,808. Patented Sept. 17, 1901.
W. J. P. MOORE.
STEAM VALVE FOR DUPLEX PUMPS.
(Application filed Sept. 29, 1900.)

(No Model.) 8 Sheets—Sheet 8.

Attest
Edw. L. Reid.
R. E. Ourand.

Inventor
William James Perry Moore
by Ellis Spear
Atty.

THE NORRIS PETERS CO., PHOTO-LITHO., WASHINGTON, D. C.

UNITED STATES PATENT OFFICE.

WILLIAM JAMES PERRY MOORE, OF LONDON, ENGLAND.

STEAM-VALVE FOR DUPLEX PUMPS.

SPECIFICATION forming part of Letters Patent No. 682,808, dated September 17, 1901.

Application filed September 29, 1900. Serial No. 31,561. (No model.)

*To all whom it may concern:*

Be it known that I, WILLIAM JAMES PERRY MOORE, engineer, a citizen of the United States of America, residing at 7 Sloane street, London, W., in the county of Middlesex, England, have invented certain new and useful Improvements in Connection with Steam-Valves for Duplex Pumps, (for which I have made application for Letters Patent in Great Britain, No. 4,303, dated March 6, 1900,) of which the following is a specification.

This invention relates to improvements in connection with steam-valves and the fittings therefor for use in connection with the steam-cylinders for duplex pumps, one of the objects being to provide a piston-valve which shall have a minimum length of stroke and which can be adjusted in its travel by means of the external levers or rods for actuating the valve.

My invention also has reference to the formation and distribution of the passages and ports for the admission of the steam and exhaust in connection with the cylinders.

Figure 2:
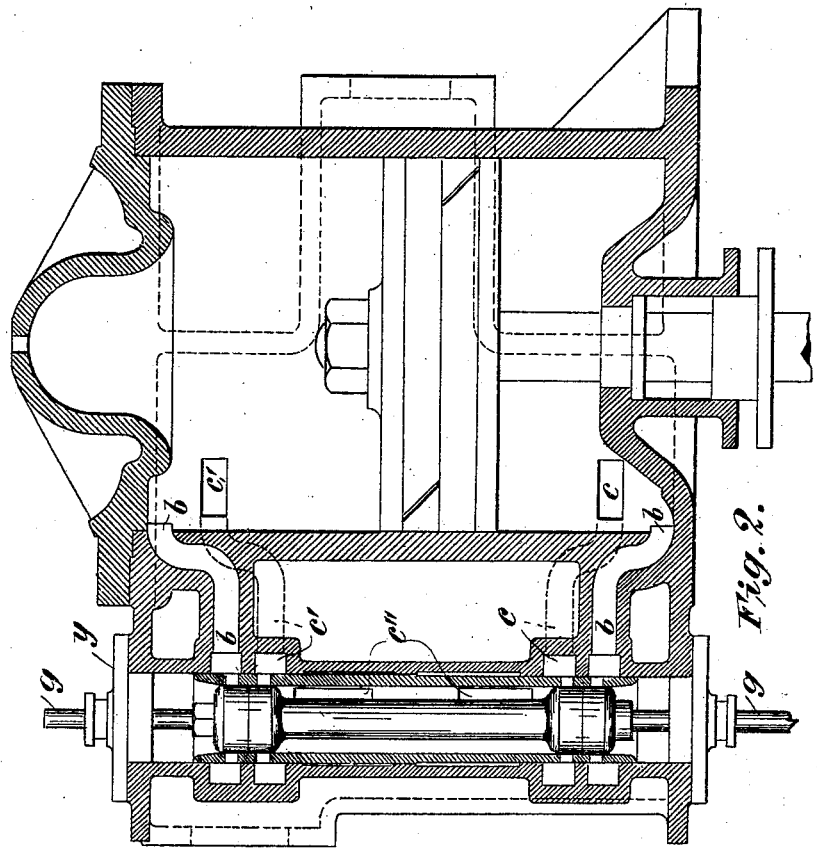
Figure 3:
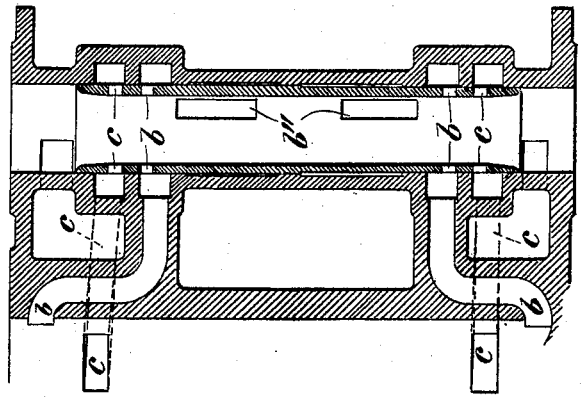
Figure 4:
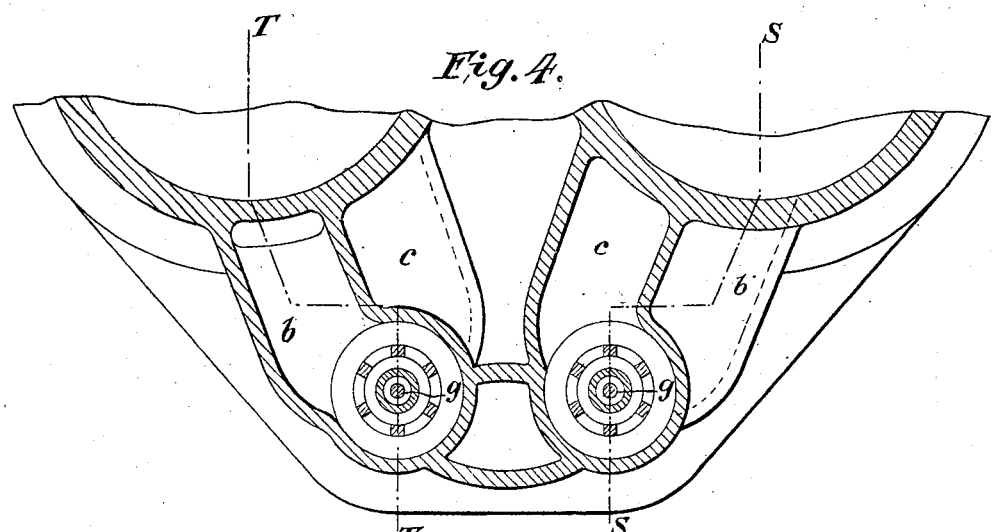
Figure 5:
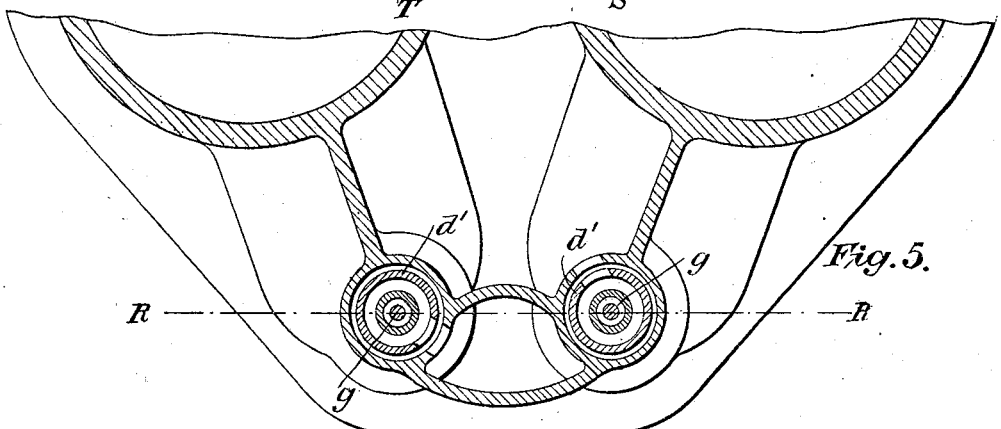
Figure 7:
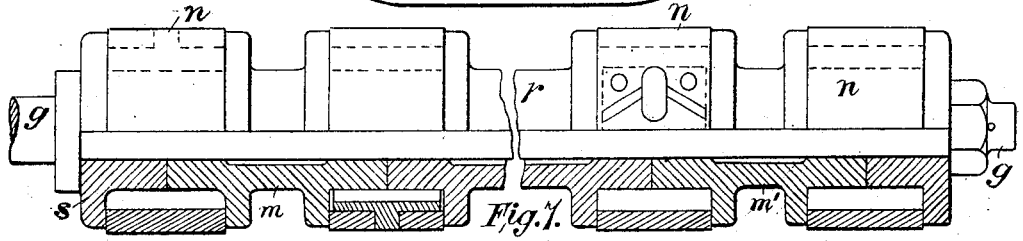
Figure 6:
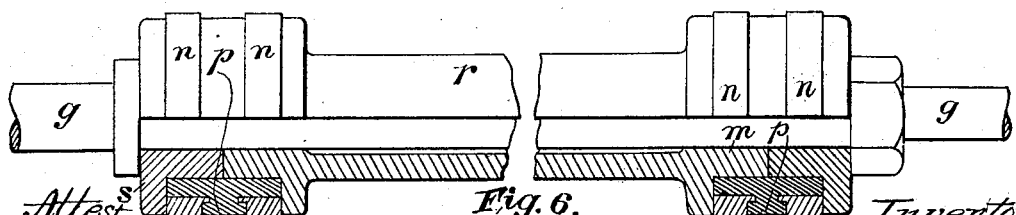
Figure 9:
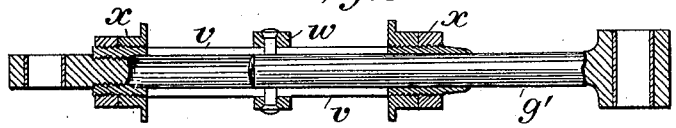
Figure 8:
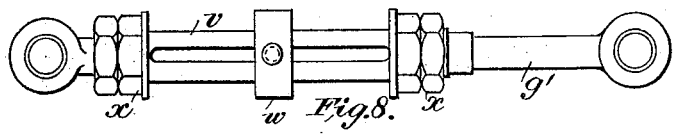
Figure 15:
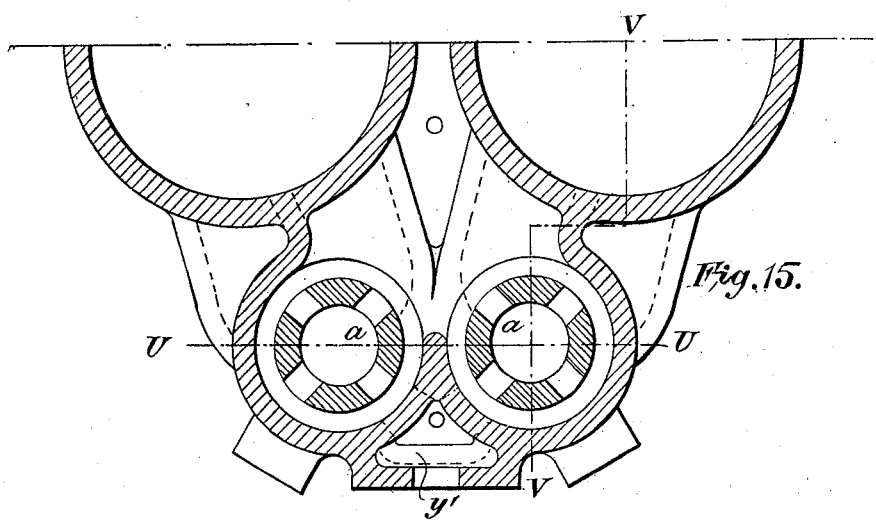
Figure 16:
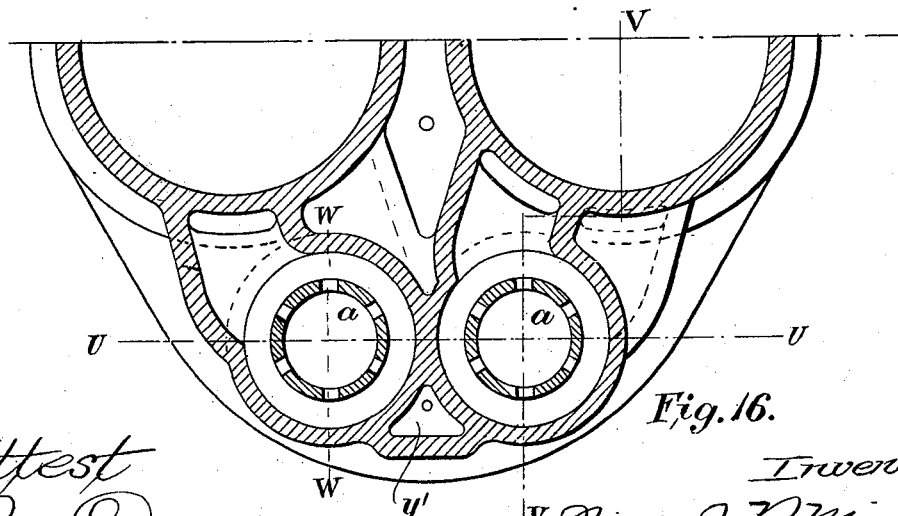
Figure 11:
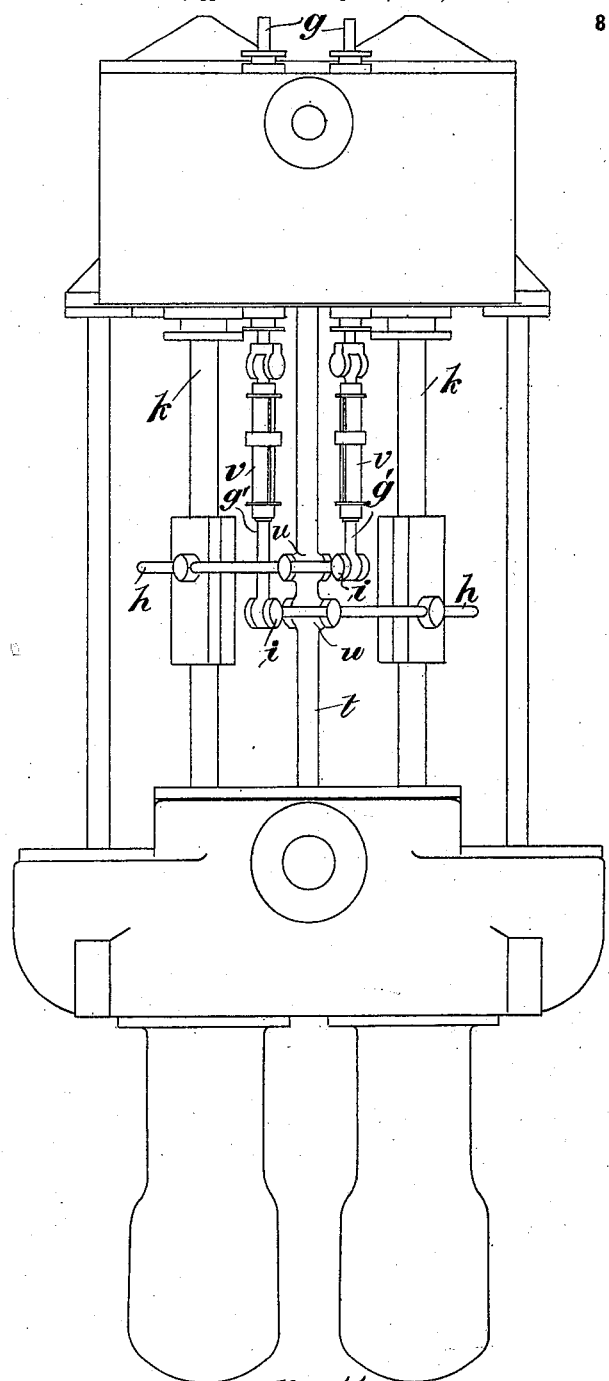
Figure 12:
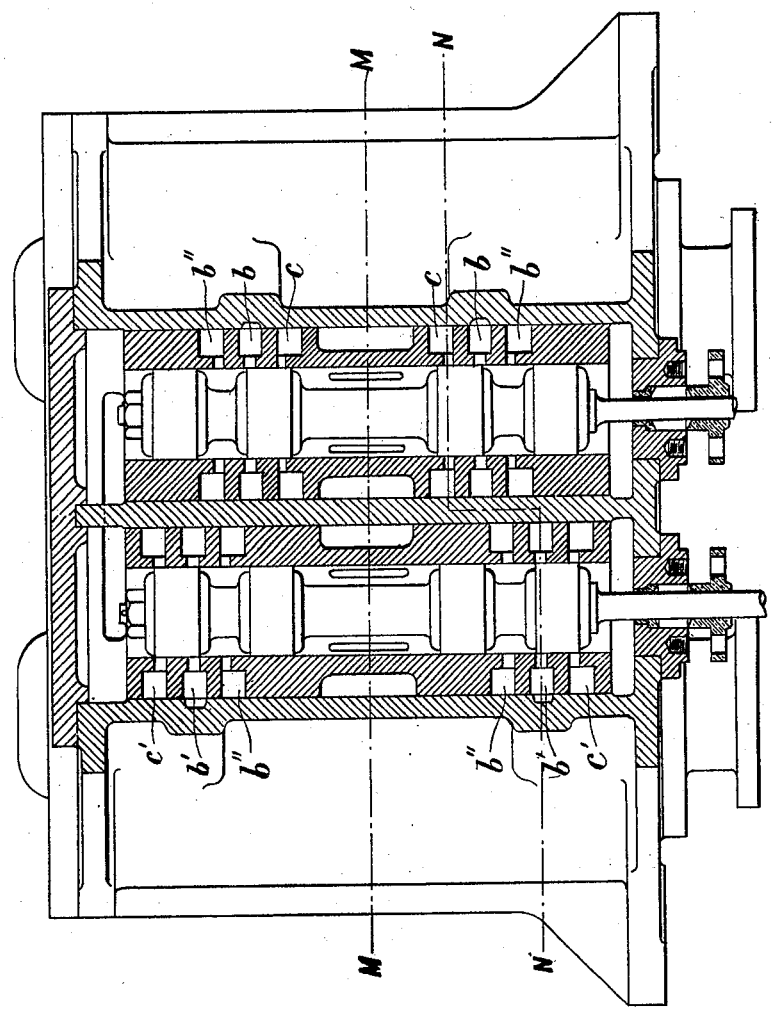
Figure 14:
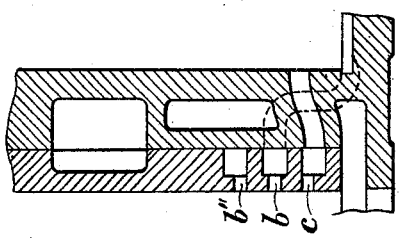
Figure 13:
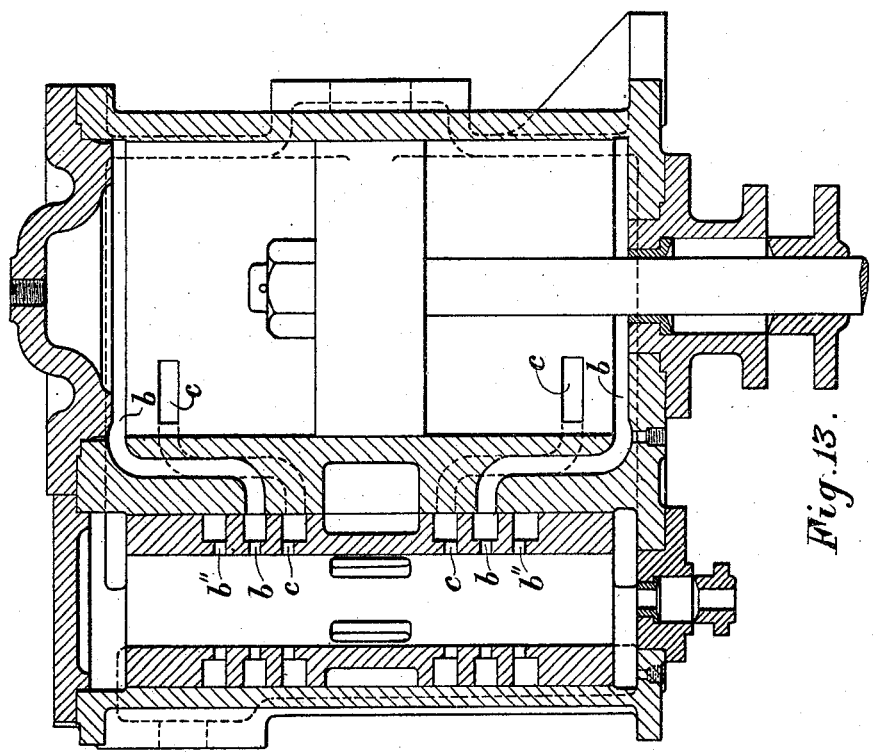

In the accompanying sheets of explanatory drawings, Figure 1 is a sectional elevation of the steam-cylinder valve-chamber having two ports at each end, the section being taken through R R in Fig. 5. Fig. 2 is a sectional elevation of the valve-chambers and cylinder, taken through S S in Fig. 4. Fig. 3 is a sectional elevation of the valve-chamber and cylinder, taken through T T in Fig. 4. Fig. 4 is a sectional plan of the cylinder and valve-chamber, taken through X X, Fig. 1; and Fig. 5 is a sectional plan of the same when taken through a different plane, Y Y, Fig. 1. Fig. 6 is a part sectional plan of the steam-valve with two piston-heads, and Fig. 7 is a part sectional plan of a similar steam-valve with four piston-heads. Fig. 8 is a plan, and Fig. 9 is a sectional elevation, of the lost-motion link. Fig. 10 is a front elevation of the steam-cylinders, and Fig. 11 is an elevation of the general arrangement of the pumps. Fig. 12 is a sectional elevation of the steam-cylinder valve-chamber having three ports or passages cut in the liner at each end, the section being taken through U U in Figs. 15 and 16. Fig. 13 is a sectional elevation of the steam-cylinder and valve-chamber, taken through V V in Figs. 15 and 16. Fig. 14 is a sectional elevation of the steam and exhaust passages, taken through W W in Fig. 16. Fig. 15 is a sectional plan of steam-cylinders and valve-chambers, taken through M M in Fig. 12; and Fig. 16 is a sectional plan of same when taken through a different plane, N N, in the same figure.

In carrying my invention into effect in one convenient manner when arranging my cylinders upon a duplex pump, as shown in the accompanying drawings, I form piston-valve chambers $a\ a$ between or upon the casting carrying the two steam-cylinders, and I provide within these two circular chambers ports for the steam and exhaust communications from the chamber to each end of the steam-cylinder. I bore out each chamber, so that a liner or bush $d$ can be introduced therein, this liner having upon it in accurately-determined positions the steam and exhaust ports $b\ b'$ and $c\ c'$ and also openings $b''\ c''$, as required for communicating with the passages formed in the main casting. The central portion of the liner I bore truly to receive my improved piston-valve, which I carry upon a valve-rod $g$, which works through stuffing-boxes at one or both sides, the motion being communicated thereto by cross-levers $h\ i$, (shown in Figs. 11,) actuated by the movement of the piston-rod K of the opposite cylinder.

I provide within each end of the valve-liner two or, if occasion requires, three annular ports or openings, and I cause my piston-valve to be provided at each end with floating piston-rings $n$, as shown in Figs. 6 and 7, the rings being carried upon a sleeve $m$, which is attached to the valve-rod in such a manner that the valve-piston rings open or close the ports at each end to exhaust or to steam in a manner determined by the movement of the levers connected to the valve-rod.

I make my ports within the steam-cylinder such that on the one cylinder at each end the steam enters from the outer ports $b\ b$, Fig. 1, while on the other cylinder steam enters from the inner ports $b'\ b'$ of the liner, the exhaust passages and ports being made to exhaust onto the ends of the piston-valve through $c\ c$ in the one cylinder and between the working faces of the valves at the ports $c'\ c'$ in the liner of the other cylinder, as shown in Figs. 1 and 2. I accomplish this varied distribution by making the ports to cross over each other in the one case, as shown in Fig. 3, while running parallel or in alinement with each other, as shown in Fig. 2, the exhaust-ports c c in each instance being arranged as the inner opening or openings at each end of the cylinder, although leading to an altered position on the working face of the valve-chamber.

I construct my piston-valve in the form of a sleeve, as shown in Figs. 6 and 7, provided with one or two enlarged or piston-like carriers at each end to work, respectively, in valve-chambers with two or three ports at each end, the piston-rings employed being preferably double, one, p, working within or resting upon the other, n, so as to provide a floating piston-surface. I make the inner portion of the sleeve m with a shoulder near to each end to serve as an abutment for the rings n p, the projecting ends of the sleeve forming guides or carriers for the inner ring and making with the end caps s distance-pieces for the piston-rings n p to fit within. Over the valve-rod g I place a cap s at each end, with a collar formed on the valve-rod at the one end and a nut or like connection at the other to secure it in position. When making a valve with two piston-heads at each end, I insert second distance-pieces m' m', (shown in Fig. 7,) which, with the end caps s, form distance-pieces for the rings of the second piston to fit within. I actuate the valve-rod by means of a motion-lever h i, (shown in Fig. 11,) carried or pivoted upon a vertical or other column t, placed between the cylinder and the outer end of the pump in such a manner that the rods are fulcrumed onto the boss-like attachments u, carried or formed upon the vertical column or support t, one end, h, of the motion-lever being connected to the piston-rod k of the one cylinder, while the other end, i, of the motion-lever is connected to the valve-rod of its companion or other cylinder.

I provide for the lost motion or difference between the comparatively long stroke of the piston-rod and the short stroke or travel of the valve-rod in one convenient manner by forming adjustable nuts upon the end of the valve-rod, against which a tappet-like head actuated from the motion-lever can work. By another arrangement I adjust this lost motion by connecting the motion-lever h i in Fig. 11 to sliding rods or links shown in Figs. 8 and 9. The end i, Fig. 11, of the motion-lever actuates the rod g', which slides within the sleeve v, this sleeve being jointed to the end of the valve-rod and provided with adjustable lock-nuts x x. The end of the inner sliding rod g' is provided with a collar w, secured to it by means of a pin passing through a slot formed in the sleeve v, so that when the rod g' is caused to travel backward and forward within the sleeve v the collar w strikes or pushes against the adjustable nuts x x and moves the sleeve, and thereby the valve-rod g, attached to it, in one direction or the other a short distance at the extreme end of each stroke of the motion-lever h i.

I modify the arrangement of my actuating and motion-rod levers and their connections with the valve-spindle and the piston-rod to suit the type of pump and cylinder to which my improved valves are to be applied. Similarly I may make my piston-valve chambers with single ports at each end, arranging the same to cross over cylinder-passages, as hereinbefore described. When constructing steam-cylinders with three-ported valve-chambers, as shown in Figs. 12, 13, 14, 15, and 16, I follow the same arrangement as hereinbefore described—viz., in the cylinder the inner ports, or those farther from the cylinder end, are for exhaust, while the outer ports, or those nearer the cylinder end, are for steam admission.

In cylinders having three-ported valve-chambers, as shown in Fig. 12, I employ a valve with four piston-heads, as shown in Fig. 7, the right-hand cylinder of the pair having the steam and exhaust port passages b and c in alinement with each other, as shown in Fig. 13, while the port b is in connection with the steam-chamber y', (shown in Figs. 15 and 16,) which supplies the steam to both valve-chambers a a. In the left-hand or companion cylinder the steam and exhaust port passages b and c cross over each other, as shown in Fig. 14, the port b being in connection with the aforementioned steam-chamber y'.

I may carry the end of my valve spindle or rod through stuffing-boxes y y, placed outside on the valve-chamber ends, as shown in Figs. 1 and 2, or upon the inside when so desired, or I may employ only ordinary single stuffing-boxes and leave the upper or farther ends of the valve-spindle free from external stuffing-boxes when so desired and as shown in Fig. 12.

Having thus described my invention, what I claim as new, and desire to secure by Letters Patent, is—

In combination in a steam-pump, duplicate steam-cylinders, pistons therein, duplicate valve-chambers, valves therein, means for operating the latter, two sets of ports in each valve-chamber, two sets of ports in each steam-chamber, the ports in the valve-chamber being connected in pairs with the ports in the steam-chamber by steam-passages, the outer ports in both steam-chambers being the inlet and the intermediate ports the outlets, the corresponding ports in one valve-chamber performing like functions, and the passages leading from the members of each set extending parallel to each other, the outer ports in the other valve-chamber being the exhaust-ports and the intermediate ones the inlet, the passages leading from the members of each pair crossing each other, substantially as described.

In witness whereof I have hereunto set my hand in presence of two witnesses.

WM. JAMES PERRY MOORE.

Witnesses:
ABNER GEORGE EVELEIGH,
ALBERT E. PARKER.